(12) United States Patent
Khalid et al.

(10) Patent No.: US 7,860,100 B2
(45) Date of Patent: Dec. 28, 2010

(54) SERVICE PATH SELECTION IN A SERVICE NETWORK

(75) Inventors: Mohamed Khalid, Cary, NC (US); Paul Quinn, San Francisco, CA (US); Kenneth Durazzo, San Ramon, CA (US); Richard Manfred Pruss, Tewantin (AU)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 12/243,491

(22) Filed: Oct. 1, 2008

(65) Prior Publication Data

US 2010/0080226 A1    Apr. 1, 2010

(51) Int. Cl.
*H04L 12/28* (2006.01)
(52) U.S. Cl. ............................... 370/392; 370/229
(58) Field of Classification Search .................. None
See application file for complete search history.

(56) References Cited

U.S. PATENT DOCUMENTS

| 3,629,512 | A | 12/1971 | Yuan |
| 5,408,231 | A | 4/1995 | Bowdon |
| 5,491,690 | A | 2/1996 | Alfonsi et al. |
| 5,600,638 | A | 2/1997 | Bertin et al. |
| 5,687,167 | A | 11/1997 | Bertin et al. |
| 6,400,681 | B1 | 6/2002 | Bertin et al. |
| 6,661,797 | B1 | 12/2003 | Goel et al. |
| 6,687,229 | B1 | 2/2004 | Kataria et al. |
| 6,993,593 | B2 | 1/2006 | Iwata |
| 2003/0123446 | A1* | 7/2003 | Muirhead et al. ........... 370/392 |
| 2004/0148391 | A1* | 7/2004 | Lake et al. .................. 709/224 |
| 2005/0289244 | A1 | 12/2005 | Sahu et al. |
| 2010/0080226 | A1* | 4/2010 | Khalid et al. ............... 370/392 |

* cited by examiner

*Primary Examiner*—Robert W Wilson
(74) *Attorney, Agent, or Firm*—Brinks Hofer Gilson & Lione

(57) ABSTRACT

A service chain system is provided. The system includes a packet of data that is operable to pass through a network of service nodes as defined by a service chain; and a service classification device that is operable to change the service chain based on a system performance.

20 Claims, 5 Drawing Sheets

SERVICE PATH SELECTION IN A SERVICE NETWORK

FIELD OF TECHNOLOGY

The present embodiments relate to selection of a service chain in a service network.

BACKGROUND OF TECHNOLOGY

A service chain is an ordered list of service features to be applied to a packet of data in a data network. In a data network, the service chain is fixed according to location of the service devices providing the service features. Once defined, the service chain is not altered.

DETAILED DESCRIPTION

The present embodiments relate to defining a service chain based on system performance, such as service level agreement. A service system may be used to route packets of data to optimal service nodes based on the behavior or performance of the service nodes. The packets may be routed to service nodes that provide service in accordance with a service level agreement. For example, the packets of data may be transmitted to service nodes that have the fastest service time, lowest latency, most complete capabilities for a task or secure physical location relative to other service nodes in the service network.

In a first aspect, a system includes a packet of data that is operable to pass through a network of service nodes as defined by a service chain; and a service classification device that is operable to change the service chain based on system performance.

In a second aspect, a method includes receiving a packet of data; classifying the packet of data; determining a service chain based on the classification of the packet of data, the service chain defining a first service node to perform a service on the packet; determining service performance at the first service node and a second service node; and changing the service chain based on the service performance at the first and second service nodes.

In a third aspect, a method includes determining service performance at a service node operable to provide a service to a packet; and changing a service chain based on the service performance.

Figure 2:
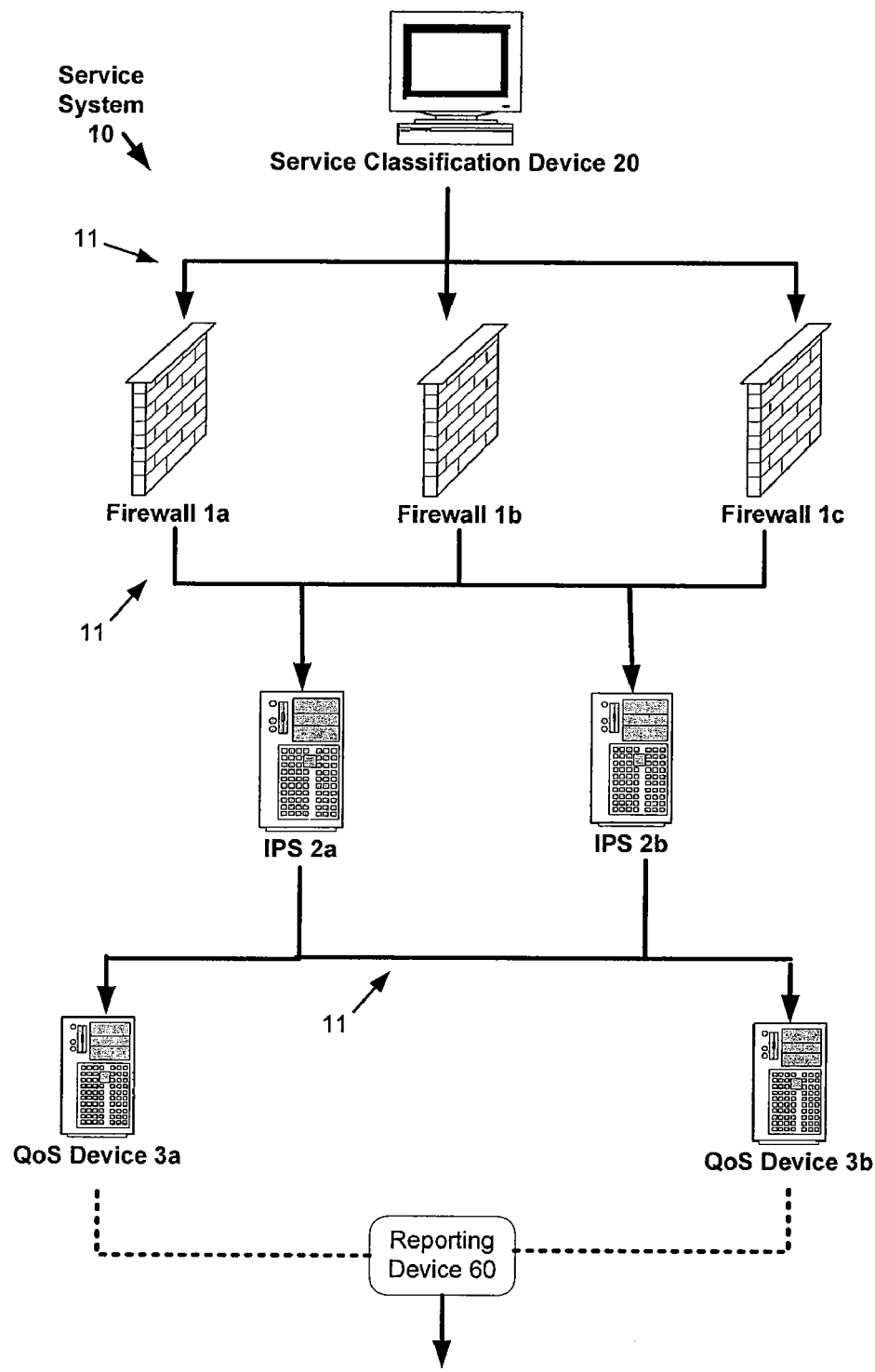
FIG. 2 shows another embodiment of a service insertion system.

As one example of using a service system, a participant may use a search engine to search the Internet for information relating to the participant's family history. The participant sends a search request, which is packetized, to a search engine server having access to information about relevant site addresses. However, because the participant is using an endpoint that is subject to a service level agreement, the participant's request passes through various service nodes before being submitted to the search engine server. For example, the request packet may pass through a firewall, an intrusion prevention system (IPS), and a quality of service (QoS) device. As shown in FIG. 2, the request packet passes through one of the firewalls 1a, 1b or 1c, an IPS 2a or 2b, and a QoS device 3a or 3b. The service system may automatically pass the request packet through the optimum service nodes based on the system performance, such as the speed of service at one or more of the service nodes, instead of assigning the service chain without regard to system performance. The service system may choose the service nodes that will provide service in accordance with the service level agreement.

Figure 1:
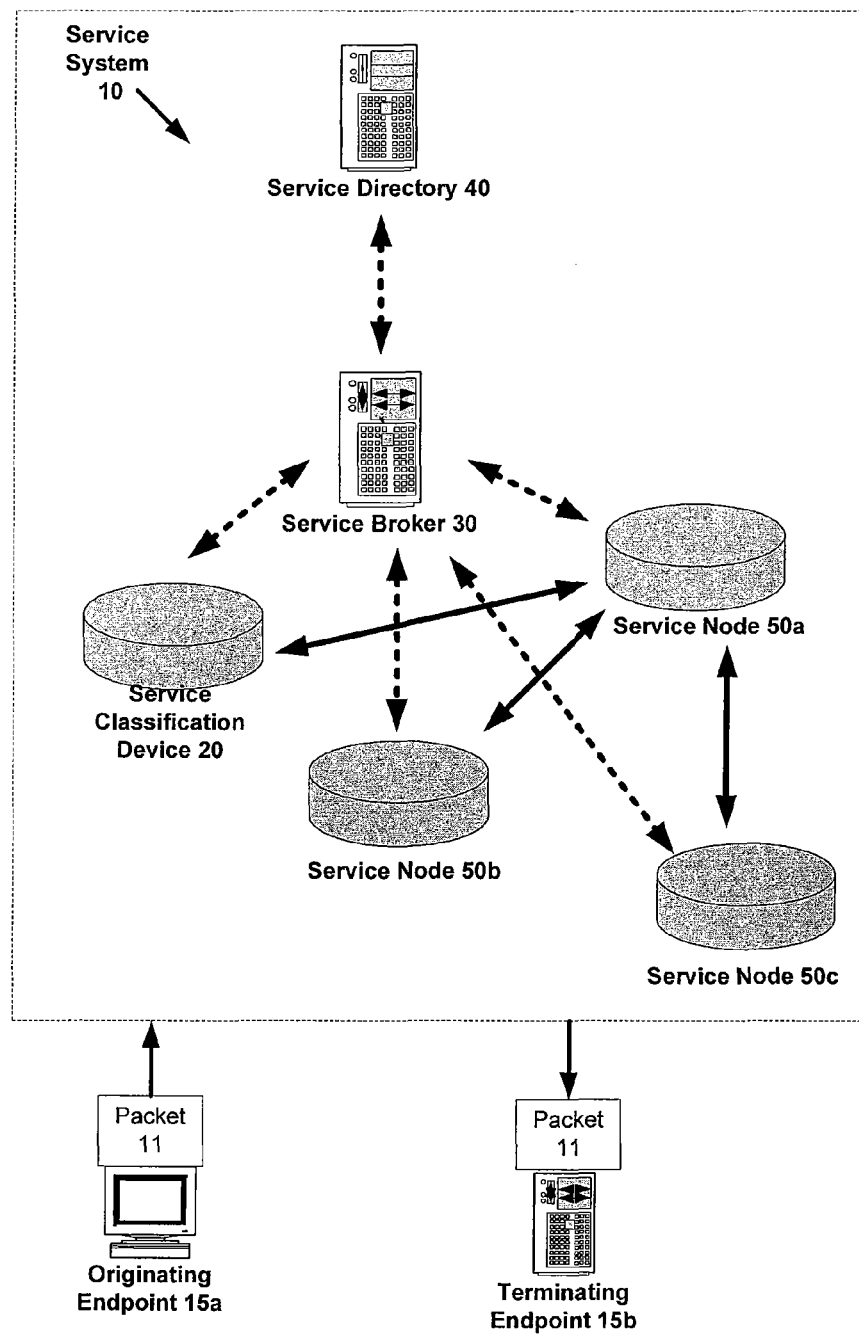
FIG. 1 shows one embodiment of a service insertion system.

FIG. 1 shows a service system 10. The service system 10 includes a service classification device 20, a service broker 30, a service directory 40, and one or more service nodes 50. Additional, different, or fewer components may be provided. For example, one or more endpoints 15a, 15b may be in or connected to the service system 10. In another example, the service classification device 20 may operate as and perform the functions of the service broker 30 and eliminate the need for a separate service broker 30.

The service system 10 is a service domain, service insertion architecture, service insertion system, or a network for transmitting packets of data. The service system 10 may be a platform independent framework, design, or architecture for inserting services into a data network. Alternatively, or in addition to, the service system 10 is a hardware dependent framework, design, or architecture for inserting services into a data network. The service system 10 may be a service network that performs various services on a packet 11 transmitted to or from an originating endpoint 15a. For example, a packet 11 of information, transmitted from an originating endpoint 15a, may pass through various service devices or nodes, such as the service classifier 20 or service node 50, before being provided at a terminating endpoint 15b. Although discussed as different devices, the components in the service system 10 may be combined into one or more devices, such as a router. The service system 10 may be a collection of service classifiers, brokers, directories and nodes that operate together, within a common management plane, to deliver optimum services.

The service system 10 may automatically direct a packet of data to one or more service nodes 50 based on system performance. System performance may include transmission time from one service node to another service node, service time to perform a service at one or more service nodes, a service node load, a combination thereof, or any other system performance measurement.

The endpoints 15a, 15b are personal computers, servers, remote terminals, network endpoints, or any other communication devices. The endpoints 15a, 15b may be used to transmit and receive packets 11 of data. In the example above, a participant may use the endpoint 15a to search the Internet, packetize a search request, and transmit the packet 11.

Figure 3:
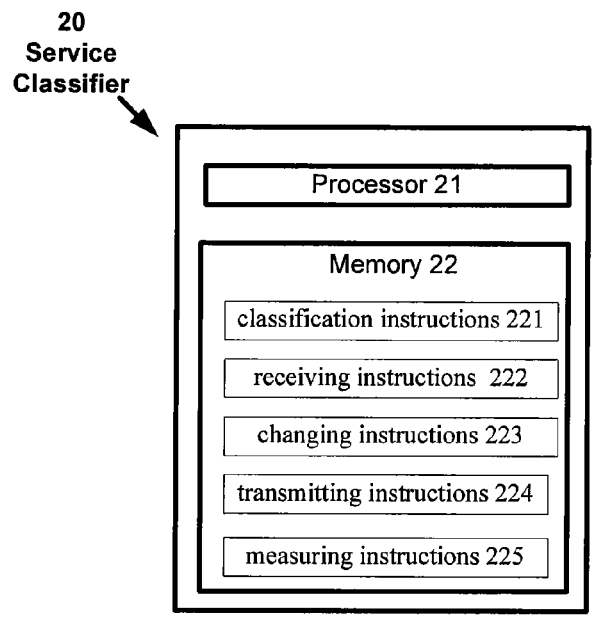
FIG. 3 shows one embodiment of a service classification device.

As shown in FIG. 3, the service classification device (service classifier) 20 may include a processor 21 and memory 22. Additional, different, or fewer components may be provided. The service classifier 20 provides automated assistance for classifying the packet 11 and transmitting the packet 11 of data to a first service node 50.

The processor 21 may receive or retrieve a packet 11 of data. The packet 11 of data may be received from the endpoint 15a, as shown in FIG. 1. The service classifier 20 may communicate with the endpoint 15a using a communication network. The communication network may be defined by any now known or later developed protocol, such as an Internet Protocol (IP) or Transmission Control Protocol (TCP). Alternatively, the packet may be transmitted using an internal network, such as circuitry, communication wires, or a wireless device.

In the example above, the participant uses the endpoint 15*a* to search for a specific topic, such as "Johnson Family Tree." The search request may be transmitted from the originating endpoint 15*a* to the terminating endpoint 15*b*, which may be a search engine server. The originating endpoint 15*a* may packetize the topic request data in a packet 11 and transmit the packet 11 to the service classifier 20.

The processor 21 may classify the packet. The classification may be based on packet 11 information. The packet 11 information may include information related to the originating endpoint 15*a*, terminating endpoint 15*b*, traffic type, packet 11 contents, a rule, or any combination thereof. A table of classifications may be stored in the memory 22 and matched to the packet 11 information. Classifications may be, for example, "bestservice," "fastestservice,""safestservice," "20.1.2," or "search engine 2.0". The classification may be a service namespace. A service namespace is a string used to identify a service mapping (e.g., a name used to retrieve a service header ID). For example, "search engine 2.0." might refer to service header ID "100." Service namespace has context between service classifiers and service brokers.

In one embodiment, a classification is set as a rule. The rule may be predefined and stored in memory or set for an individual packet. For example, the memory 22 may store a rule that classifies a packet 11 as "best service," if the packet (or traffic) is for a defined search engine server, such as a Google server. In another example, the participant, using the originating endpoint 15*a*, may set the classification.

A rule may be set forth in a service level agreement (SLA). A SLA may be all or part of a service contract where the level of service is defined. The level of service may include the services, priorities, responsibilities, guarantees, or any other service related performance. For example, it may specify the levels of availability, serviceability, performance, operation, or other attributes of the service like billing and even penalties in the case of violation of the SLA. The SLA may be a contracted delivery time (of the service) or performance, and negotiated between two parties. The SLA may be a contract that exists between customers and their service provider, client or between service providers. For example, a SLA may be between the originating endpoint's 15*a* owner and a service provider. In the above example, an SLA may require that packets 11 originating from endpoint 15*a* be classified as "bestservice." The rules set forth in the SLA may be stored in memory 22.

The classification may define one, none, or multiple services performed for the packet 11. The services may include passing the packet through a firewall, an intrusion prevention system (IPS), a quality of service (QoS) device, rate-limiting device, deep packet inspection (DPI) or any other service provided by the service nodes 50. For example, the "bestservice" classification may require the packet 11 to pass through a firewall, an IDS machine, and a QoS machine. In another example, the "worstservice" classification may require the packet 11 to pass through a QoS machine.

The processor 21 may receive or retrieve service information associated with the classification. The service information may be stored in the service directory 40, memory 22, or any other data store. For example, the processor 21 may transmit the classification to the service broker 30 and receive the service information from the service broker 30. In another example, the memory 22 may store service information related to the classification. The processor 21 may retrieve the service information from the memory 22.

The service information may include a service header, next-hop information, and tunnel information. Additional, different, or less information may be provided. The service header defines a class of traffic derived from the classification. From that class, a service chain may be derived. The service information will be discussed below, with respect to the service directory.

The service header may include information about the service chain, information about the packets for the services, packet status information, any combination thereof, or any other service system 10 related information.

The service header may be information added to a packet 11 that defines a service chain and/or next hop information. The service header may define a service chain.

The service header may be associated with two different service chain paths, but be served by different service nodes 50. In the example of FIG. 2, the service header "100" may relate to two different service chains 100', 100". As shown in FIG. 2, a packet 11 passing through either service chain 100' or 100" will pass through a firewall, IPS device, and a QoS device. However, the service times may differ. The processor 11 may determine which service chain 100' or 100" to use based on system performance, SLA agreement, packet 11 information, a combination thereof, or any other service system 10 information.

A service header may be encoded into a simple value to create an efficient, standard approach to represent a header. For example, a service chain of firewall to IPS to QoS may be represented by an integer value 100. Additional information may be included in the encoded service header. For example, for the service header "100.x", the "100" may relate to a specific service chain and the "x" may relate to the packet's 11 status. In other words, the packet's status may be where the packet is located in the service chain. For example, each time a service is provided to the packet, the value "x" may be incremented by an integer, such as 1, to indicate that another service has been performed.

Next-hop information may include information about the following hop. A hop is a trip that the packet 11 may make from a source to a destination. For example, a hop is the trip from the service classifier 20 to a service node 50, or from service node 50*a* to service node 50*b*. The next-hop information may include an address of the next receiving device or node. For example, the address indicating where the next service is provided may be included in the next-hop information. In another example, the hop count may be included in the service header. The hop count may be the number of hops it will take for a packet to make it from a source to a final destination. The hop count may relate to the number of services provided to the packet 11 between the service classifier 20 and the terminating endpoint 50*b*.

The processor 21 may insert the service header into the packet 11. The header may be inserted into the beginning of the packet and transmitted with the packet 11 to the service nodes 50 in the service chain. The service header may be changed or removed by one or more service nodes 50, service broker 30, or service classifier 20.

Figure 4:
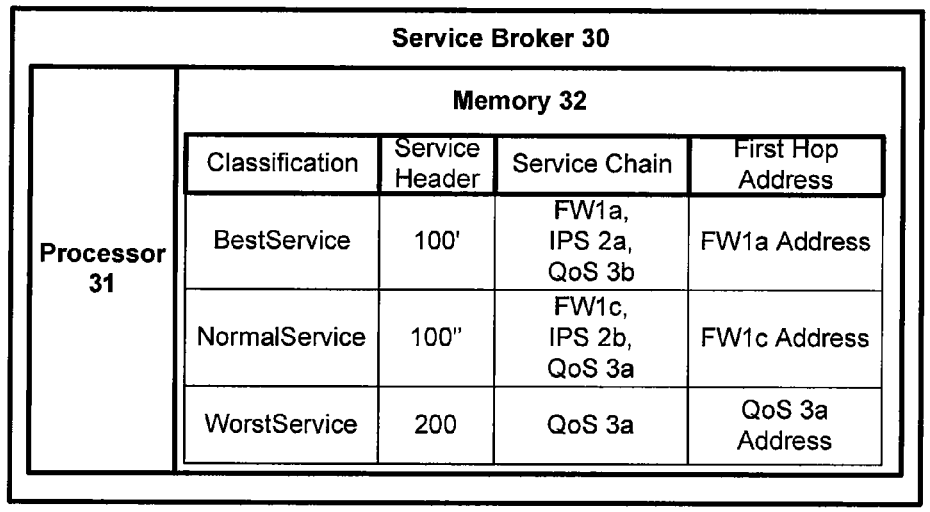
FIG. 4 shows one embodiment of a service broker.

The processor 21 may change the service header based on system performance, packet 11 information, an SLA, a combination thereof, or other service system 10 related information. Changing the service header may change the service chain. Accordingly, the processor 21 may define the service chain based on system performance. As discussed above, system performance may include transmission time from one service node to another service node, service time for performing a service at one or more service nodes, a processing load at one or more of the service nodes, a combination thereof, or any other system performance measurement. In the above example, the packet 11 may include a service header 100', as shown in FIG. 4, but because the firewall 1a is delayed, the processor 21 may change the service header 100' to service header 100".

The processor 21 may measure or determine service performance. System performance may include transmission time, service time, or processing load.

The processor 21 may determine transmission time from one service node to another service node. As will be discussed below, the packet 11 of data may be time stamped when received at and/or when leaving a service node 50. Accordingly, the transmission time may be determined by calculating the amount of time between time stamps. For example, the transmission time from a transmission service node, such as firewall 1a, to a receiving service node, such as IPS 2a may be determined. The processor 21 may calculate, receive, or retrieve the transmission time. For example, the processor 21 may receive the transmission time from a reporting device (discussed below), one or more service nodes 50, or the service broker 30. In another example, the processor 21 may retrieve the transmission time for a defined time period from memory 22. The transmission time during peak times may differ from non-peak times, for example.

The processor 21 may determine the time it takes to perform a service at one or more service nodes 50 (i.e., service time). The processor 21 may calculate, receive, or retrieve the service time. Calculation may include measuring the amount of time between time stamps. For example, measuring the amount of time between the received time stamp and the transmitted time stamp. The processor 21 may receive a service time from a reporting device 60, which is discussed below, one or more service nodes 50, or the service broker 30. Alternatively, or in addition to calculation or receipt of, the processor 21 may retrieve the service time from memory 22. The stored service times may be categorized by periods of time, such as peak times and non-peak times. The transmission time during peak times may differ from non-peak times, for example.

The processor 21 may transmit a packet 11 to a service node 50. The packet 11 may include the service header. The processor 21 may transmit the packet 11 to a first hop service node 50 using the first hop node address transmitted as a part of service information. The first hop service node may be the first service node 50 in a service chain. In the example shown in FIG. 2, the firewall 1a address may be the first hop service node 50 for a packet 11 having a service header 100' shown in FIG. 4.

The processor 21 may monitor one or more service nodes 50. Monitoring may include ensuring that system performance is acceptable. For example, the processor 21 may ensure that a packet 11 of data is being transmitted to a service node 50 with the fastest service time among registered service nodes. In another example, the processor 21 may compare a service level agreement (SLA) to system performance. If system performance is outside the provisions of the SLA, then the processor 21 may instruct one or more service nodes 50 to begin transmitting the packet 11 to services nodes 50 that are different than those defined in the service chain. In the example of FIGS. 2 and 4, the service classifier 20 may monitor the devices in the service chain for the service header 100' (e.g., firewall 1a, IPS 2a, and QoS device 3b). If a SLA agreement requires that the packet 11 of data be transmitted through the service chain in a defined period of time, the service classification device 20 may monitor the nodes 50 in the service chain to ensure that the packet 11 will be transmitted through the service chain in the defined period of time.

Otherwise, the service classification device 20 may change the service chain, so that the packet 11 does or is more likely to pass through the service chain in the defined period of time.

The processor 21 may transmit instructions to one or more service nodes 50. Instructions may be transmitted before, during, or after the processor 21 transmits the packet 11 of data to the first hop address. The instructions may instruct a service node 50 to change the service chain before, during, or after the packet 11 of data has been serviced at one or more service nodes 50. The instructions may be based on system performance, an SLA, packet 11 information, or other service system 10 information. In the example shown in FIG. 2, the instructions may instruct firewall 1a to begin transmitting packets of data with service header 100' to IPS 2b, instead of IPS 2a. The IPS 2b may provide a faster service time than IPS 2a.

As shown in FIG. 3, the memory 22 may be computer readable storage media comprising instructions. The computer readable storage media may include RAM/ROM and disks, which are tangible elements that a computer or a processor can read. The processor 21 may execute the stored instructions.

The memory 22 may include classification instructions 221, receiving instructions 222, changing instructions 223, transmitting instructions 224, and measuring instructions 225. The instructions may be executed by the processor 21, a computer or any now known or later developed instruction execution device. The instructions may be executed in the order shown or a different order. For example, measuring instructions 225 may be executed prior to classification instructions 221. Additional, different, or fewer instructions may be provided.

The classification instructions 221 may be executed to classify a packet of data. The classification may be based on a service level agreement, packet information, traffic type, a receiving device, a terminating device, or any other service related information.

The receiving instructions 222 may be executed to receive information. For example, the receiving instructions 222 may be executed to receive service information, including a service header, for the classification generated or determined when executing the classification instructions. In another example, the receiving instructions 222 may be executed to receive system performance measurements. In another example, the receiving instructions 222 may be executed to receive service chain information defining a service chain.

The changing instructions 223 may be executed to change a service chain. For example, the changing instructions 223 may be used to change a service chain based on system performance measurements received using the receiving instructions 223. The changing instructions 223 may change the service devices that the packet is transmitted to during the service chain. For example, as shown in FIG. 3, the changing instructions 223 may change the service chain such that the packet is transmitting to firewall 1c, instead of firewall 1a.

The measuring instructions 225 may be executed to measure or determine system performance. Measuring or determining system performance may include retrieving a service time from one or more additional service nodes, such as the registered next hop service nodes.

The transmitting instructions 224 may be executed to transmit the packet in accordance with the service chain.

As shown in FIG. 4, the service broker 30 includes a processor 31 and memory 32. Additional, different, or fewer components may be provided. For example, the service broker 20 may include the service classification device 30. The service broker 20 may distribute control messages that control the flow of packets 11 in the service system 10. For example, the service broker 20 may transmit service information between the service classification device 20 and the service directory 40.

The processor 31 may communicate with the service nodes 50 and/or service classifier 20 using the control plane. The service broker 30 may receive a request for service information for a defined classification from the service classifier 20. The service classifier 20 may have access to or be provided with authorization to transmit/receive communication from the service broker 30. For example, the service classifier 20 may transmit the classification "bestservice" to the service broker 30 and receive service information in return that defines a service chain for the packet 11 of data. As will be discussed below, the service information may include a service header that defines a service chain and a first hop address. The service broker 30 may authenticate and authorize a service classifier 20 and/or a service node 50. The service broker 30 may communicate service header information, next-hop information, and tunnel information to the service nodes 50.

The processor 31 may register services provided at service nodes 50. The service nodes 50 may contact the service broker 30 to register the service. The service broker 30 may transmit information about domain-wide services and service header to the service broker 30. The processor 31 may map the registered service nodes 50. In other words, the processor 31 may associate services with service nodes and service node addresses.

The processor 31 may communicate with the service directory 40. The service directory 40 is a store for service related information. The service broker 30 or other service directories may communicate with the service directory 40. The service directory 40 may include or have access to service chain information, service node mapping configuration information, service header information, service classification information, or other service related information. For example, a policy plane may create or define a service chain and transmit the service chain to the service directory 40.

The processor 31 may retrieve service information. As shown in FIG. 4, the processor 31 may retrieve service information from the service directory 40. The processor 31 may retrieve a service header, next hop address and/or other information stored in the service directory. Although shown in FIG. 4 as separate components, the memory 22 may include the service directory 40 as a single component.

The processor 31 may transmit service information to the service classifier 20 and the registered service nodes. For example, the processor 31 may transmit a service header and next hop address to the service classifier 20. In another example, the processor 31 may transmit service information to the service nodes 50. The service broker 30 may provide next hop addresses to the service nodes 50, in addition to the service header. The next hop address and service header may be associated. The next hop address may instruct the service node 50, where to transmit the packet 11 after the service node 50 is finished servicing the packet 11. In the example shown in FIG. 2, the processor 31 may transmit the service header 100' and IPS 2a address (e.g., next hop address) to the firewall 1a. Accordingly, when the firewall 1a receives a packet 11 including the service header 100', the firewall 1a may transmit the packet 11 to the IPS 2a, in accordance with the service chain defined by header 100'.

The processor 31 may monitor one or more service nodes 50 and/or the service classifier 20. Monitoring may include ensuring that system performance is acceptable. For example, the processor 31 may ensure that a packet 11 of data is being transmitted to the service node 50 processing with the fastest service time. In another example, the processor 31 may compare a service level agreement (SLA) to system performance. If system performance is outside the provisions of the SLA, then the processor 31 may instruct one or more service nodes 50 to begin transmitting the packet 11 to services nodes 50 that are different than those defined in the service chain.

In the example of FIG. 2, the service broker 30 may monitor the devices in a service chain (e.g., firewall 1a, IPS device 1b, and QoS device 1a). If a SLA agreement requires that the packet 11 of data (or a group of packets) be transmitted through the service chain in a defined period of time, the service classification device 20 may monitor the nodes 50 in the service chain to ensure that the packet 11 (or group of packets) will be transmitted through the service chain in the defined period of time. Otherwise, the service classification device 20 may change the service chain, so that the packet 11 does pass through the service chain in the defined period of time.

The service broker 30 may calculate, receive, or retrieve system performance measurements. For example, the service broker 30 may calculate service time or transmission time. Alternatively, or in addition to, the service broker 30 may receive system performance measurements from a reporting device.

The service broker 30 may transmit instructions to the service classifier 20 and/or one or more service nodes 50. Instructions may be transmitted before, during, or after a packet 11 of data is transmitted to the service nodes 50. The instructions may instruct a service node 50 to change the service chain before, during, or after the packet of data has been serviced at one or more service nodes 50. The instructions may be based on system performance, service performance, an SLA, packet 11 information, or other service system 10 information.

Figure 5:
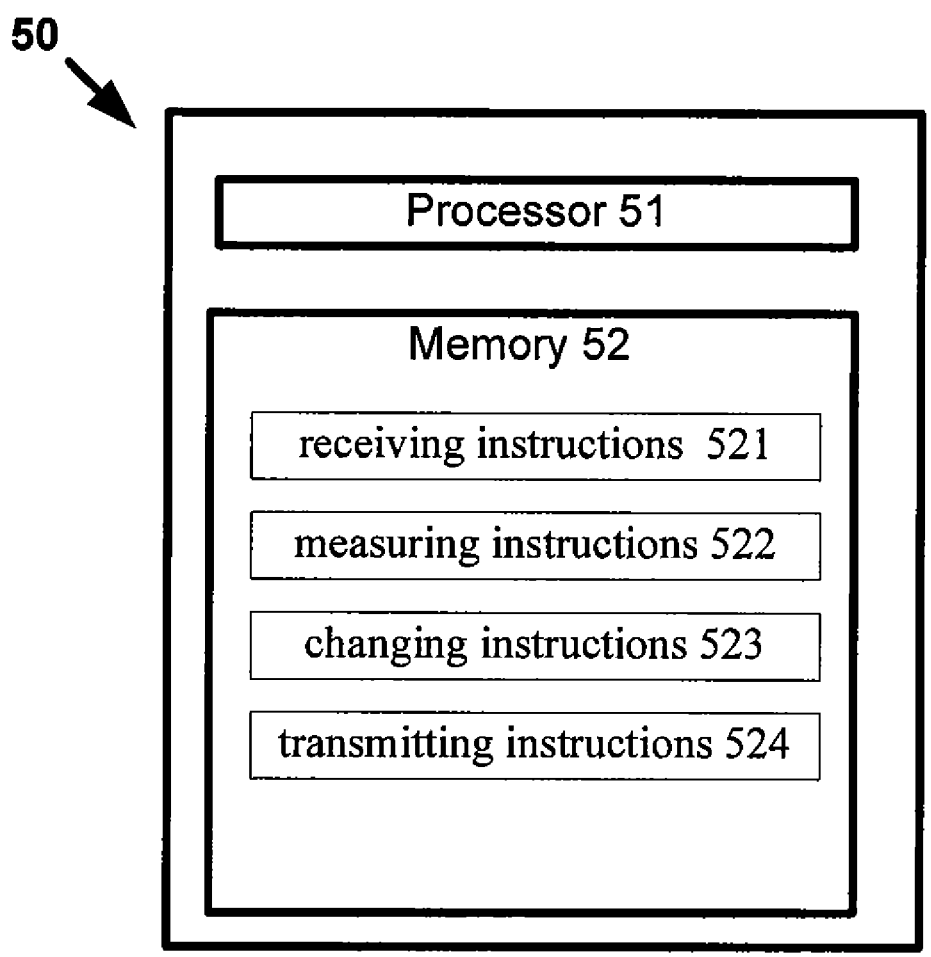
FIG. 5 shows one embodiment of a service node.
Figure 6:
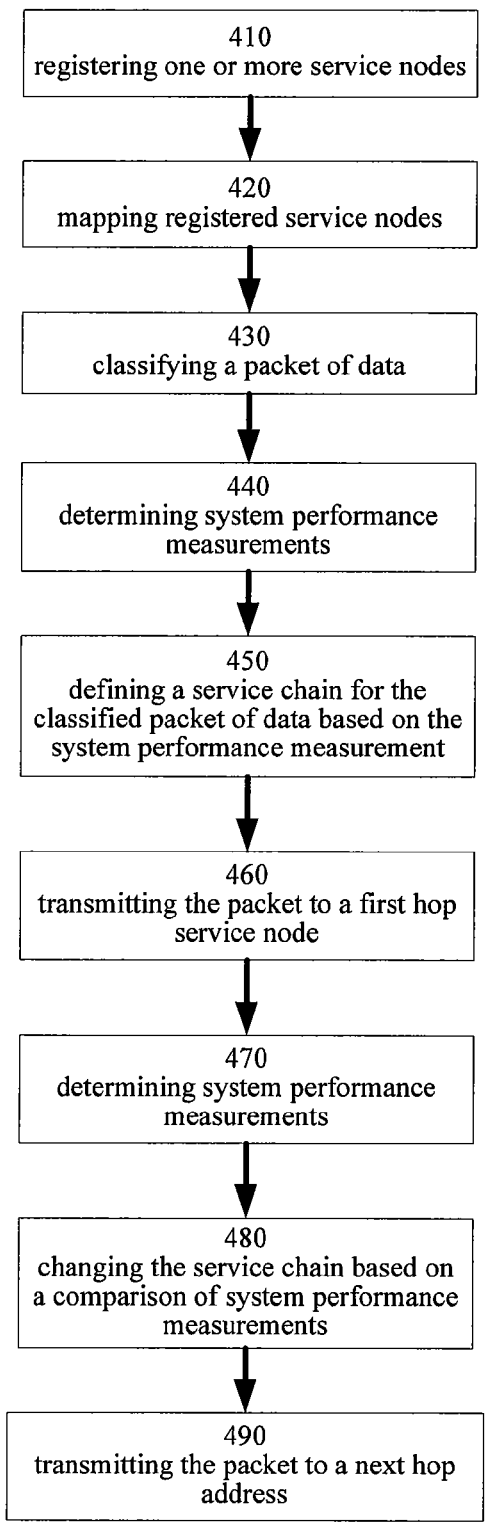
FIG. 6 shows one embodiment of a method for providing service to a packet of data.

As shown FIG. 5, the service node 50 includes a processor 51 and a memory 52. Additional, different, or fewer components may be provided. The service node 50 is, for example, a firewall, intrusion prevention system (IPS), or a quality of service system (QoS), or any other now known or later developed service device. The service node 50 automatically performs a service to the packet 11 of data. The service may include one or more acts depending on the configuration of the service node 50.

Herein, a "network of service nodes" may include zero, one, or more service nodes 50.

The service node 50 may be a service device having a defined location. The service classifier 20, service broker 30, and other service nodes may communicate with a service node 50 using an address for the defined location. For example, the service classifier 20 may transmit instructions to a service node address, such as the first hop address or next hop address.

The processor 51 may register the service node 50. The processor 51 may transmit information about the services offered, capabilities and location of the service node 50. The information may be transmitted to the service broker 30, so that the service broker has a complete view of the available services and locations of the service nodes. As discussed above, the service broker 30 may use this information to map the registered service nodes 50.

The processor 51 may receive service information. Service information may be received from service classifier 20, service broker 30, another service node, a combination thereof, or any communication device. As discussed above, service information may include header information, next hop information, and tunnel information. The received service information may be used to provide flow through a service chain.

In the example shown in FIG. 3, a service header 100' may indicate that the service chain includes transmitting the packet through the firewall 1a, IPS device 2b, and QoS device 3a. The processor for the firewall 1a may receive information that instructs the firewall to pass a packet 11 to IPS device 1b when the packet 11 includes a service deader 100'. To this end, the processor for the firewall 1a may receive a next hop address that defines the IPS device 2b address. The packet 11 may be transmitted from firewall 1a to IPS device 1b using this address.

The processor 51 may receive a packet 11. The packet 11 may be received from the service classifier 20, service broker 30, another service node, a combination thereof, or any communication device. The packet 11 may include a service header. The processor 51 may use the service header to identify the service chain that the packet 11 is being transmitted through. The processor 51 may also recognize the next hop address.

The processor 51 may time stamp the packet 11 with a received time stamp. The time stamp may be used to determine the transmission time from the transmitting device, the service time for the service node 50, or other performance related information. The time received may be transmitted to a reporting device, the service classifier, or service broker.

The processor 51 may perform a service to the packet 11. As discussed above, the service node 50 is operable to pass the packet through a firewall, an intrusion prevention system (IPS), quality of service (QoS) device, rate-limiting device, deep packet inspection (DPI) or any other service provided by the service nodes 50.

The processor 51 may change the service chain before, during, or after a service is performed on a packet 11. Changing the service chain may include receiving performance measurements or receiving instructions, comparing service performance measurements, determining a next hop service node, updating service information.

The processor 51 may receive performance measurements for one or more possible next hop service nodes. Performance measurements may be received from the service broker 30, service classifier 20, one or more service nodes, a reporting device, or a combination thereof. For example, as shown in FIG. 2 for service header 100', the firewall 1a may receive performance measurements for IPS devices 2a and 2b. The processor 51 may compare the performance measurements to each other or to a service level agreement to determine the next hop service node. For example, the processor 51 may request service performance measurements from one or more possible next hop service nodes. Requesting may include pinging the possible next hop service nodes. In another example, the processor 51 may request service performance measurements from a reporting device, service classifier 20, or service broker. As shown in FIG. 2, the firewall 1a may ping system performance measurements from IPS 2a and IPS 2b.

The processor 51 may compare the received service performance measurements. Comparison may include comparing the service performance measurements to other service performance measurements, comparing the service performance measurements to a service level agreement, or comparing the service performance measurements to a minimum threshold.

The processor 51 may compare the service performance measurements to other service performance measurements. For example, the processor 51 may obtain two or more sets of service performance measurements and compare the sets to determine the optimum set of measurements and the optimum service node for the service chain. The optimum set of performance measurements may relate to the service node 50 with the fastest service time or least load. For example, as shown in FIG. 2, the firewall 1a may compare service performance measurements of IPS 2a and IPS 2b to determine which of the service nodes has the fastest service time.

The processor 51 may compare the service performance measurements to a service level agreement. For example, the service performance measurements for a next hop service node may be compared to a service level agreement to determine if transmitting the packet 11 to the next hop service node will be in accordance with the service level agreement. The comparison to the service level agreement may be used to determine if the processor 51 should transmit the packet 11 to the next hop service node. For example, if the service performance measurements are outside of the service level agreement (e.g., service time for the next hop service node is greater than the agreed upon service time), then the processor 51 may determine a service node that has service performance measurements within the service level agreement and transmit the packet 11 to the service node that has service performance measurements within the service level agreement.

Similar to comparing the service performance measurements to a service level agreement, the processor 51 may compare the service performance measurements to a threshold value. The threshold value may be manually or automatically set and may be a minimum threshold or maximum threshold. The threshold value may set based on an acceptable level of performance, such as a time for servicing or load capacity. For example, if "x" is the acceptable amount of time for servicing a packet 11, then the processor 51 may compare the service time to "x." In another example, the processor 51 may compare the current processing load on the service node 50 to an acceptable level of a processing load.

The processor 51 may generate or receive instructions to change the service chain. The instructions may be received from the service classifier, the service broker 30, service classifier 20, one or more service nodes, a reporting device, or a combination thereof. For example, the service broker 30 may monitor one or more additional service nodes to determine the optimum route for the packet. The optimum route may be the fastest route from end to end. The service broker 30 may instruct the service node 50 to direct the packet 11 to a service node not defined in the service chain. For example, as shown in FIG. 3 for service header 100', the service broker 30 may instruct the firewall 1a to transmit the packet 11 to IPS 2b, and not IPS 2a, as defined in the service chain for service header 100'.

The processor 51 may determine a next hop service node. Determining the next hop service node may be based on received information, comparisons, or instructions. The next hop service node may be the originally defined next hop address or may be a different next hop address. Accordingly, the processor 51 may change the service chain based on service performance measurements.

The processor 51 may update service information based on comparisons or instructions. Updating the service information in a packet 11 may include updating one or more next hop addresses. For example, the processor 51 may change the next hop address, so that the packet 11 is transmitted to a service node that is different than the next hop address transmitted to the service node during registration and/or defined in the service chain.

In one embodiment, the processor 51 may update or insert service node information into the packet 11. The service node information may relate to the service node at the time of service. The service node information may be used to determine system performance. The service node information may include length of packet 11 information, packet 11 status information, and command information. For example, packet 11 status information may include processing (service) load information.

The processor 51 may transmit the packet 11 including the service node information to a reporting device, service classifier 20, or service broker. Alternatively, the processor 51 may transmit only the service node information. The information may be used to determine the processing load on the service node 50. The processing load may be used to define or change a service chain. For example, the service broker 30 may determine the processing load for firewall 1a is higher than a threshold value. Based on the determination, the processor 51 may change the service chain.

The performance of the packet 11 may be used to change the service chain for one or more packets in the future. For example, if the total service time of the packet 11 through a service chain is outside a service level agreement, the service chain may be changed to be in accordance with the service level agreement.

The processor 51 may transmit the packet 11 to the next hop address. The processor 51 may time stamp the serviced packet 11 before transmitting the packet 11 to the next hop address. The time stamp may be used to determine the transmitting time of the packet 11.

The processor 51 may report to a reporting device. Reporting to the reporting device may include transmitting information in the packet 11 to the reporting device. For example, the service time for a service node 50 may be transmitted to the reporting device. In another example, the total service time for all the service nodes 50 in the service chain may be transmitted to the reporting device. The reporting device may be used to gather service chain information. Alternatively, the processor 51 may report to the service classifier 20 or service broker 30.

As shown in FIG. 5, the memory 52 may be computer readable storage media comprising instructions. The computer readable storage media may include RAM/ROM and disks, which are tangible elements that a computer or a processor can read. The processor 51 may execute the stored instructions.

The memory 52 includes receiving instructions 521, measuring instructions 522, changing instructions 523, and transmitting instructions 524. Additional, different, or fewer instructions may be provided.

The receiving instructions 521 may be executed to receive a packet 11 of data, instructions, service chain information, or other service system related information. The measuring instructions 522 may be executed to measure or determine system performance. Measuring or determining system performance may include retrieving a service time from one or more additional service nodes, such as the registered next hop service nodes.

The changing instructions 523 may be executed to change a service chain based on system performance or instructions. Changing the service chain may include changing a next hop address. The transmitting instructions 524 may include transmitting the packet to the next hop address. The next hop address may be a service node address, service classifier address, service broker address, reporting device address, or terminating endpoint address.

As shown in FIG. 2, the reporting device 60 may be inserted into the service chain. The packet 11 may pass through the reporting device 60 before being transmitted to the terminating endpoint 15b. As the packet 11 passes through the reporting device 60, information about the service chain may be extracted from the packet 11. For example, time stamp information, such that one or more service times may be determined (e.g., by determining the time between a received and transmitted time stamp), may be extracted. In another example, the reporting device 60 may determine a processing load for one or more service nodes 50 that provided service to the packet 11.

The reporting device 60 may report to service classifier 20 and service broker 30. The reporting device 60 may determine service chains that provide optimum service performance measurements based on the information provided to the reporting device.

The processors 21, 31, 51 are general processors, digital signal processors, application specific integrated circuits, field programmable gate arrays, analog circuits, digital circuits, combinations thereof, or other now known or later developed processors. The processors 21, 31, 51 may be single devices or a combination of devices, such as associated with a network or distributed processing. Any of various processing strategies may be used, such as multi-processing, multi-tasking, parallel processing, or the like. Processing may be local, as opposed to remotely. For example, the processor 21 is operable to perform processing completed by the processor 31. The processors 21, 31, 51 are responsive to instructions stored as part of software, hardware, integrated circuits, firmware, micro-code or the like.

The memories 22, 32, 52 are computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memories 22, 32, 52 may be a single device or a combination of devices. The memories 22, 32, 52 may be adjacent to, part of, networked with and/or remote from the processors 21, 31, 52.

The memories 22, 32, 52 may be a computer readable storage media having stored therein data representing instructions executable by the programmed processors 21, 31, 52 for visually representing a project in a workspace. The memories 22, 32, 52 store instructions for the processors 21, 31, 52. The processors 21, 31, 52 are programmed with and executes the instructions. The functions, acts, methods or tasks illustrated in the figures or described herein are performed by the programmed processors 21, 31, 52 executing the instructions stored in the memory 22, 32, 52. The functions, acts, methods or tasks are independent of the particular type of instructions set, storage media, processor or processing strategy and may be performed by software, hardware, integrated circuits, firm ware, micro-code and the like, operating alone or in combination. The instructions are for implementing the processes, techniques, methods, or acts described herein.

The computer readable storage media stores data representing instructions executable by a programmed processor, such as the processors 21, 31, 52, for defining or changing a service chain based on system performance. The instructions may include acts shown in the Figures or described herein.

FIG. 4 shows a method for providing service to a packet of data. The method is implemented using the system 10 of FIG. 1 or a different system. The acts may be performed in the order shown or a different order. For example, act 430 may be performed before acts 410 and 420. The acts may be performed automatically, manually, or the combination thereof. The acts may be performed continuously, intermittently, or as a rule. For example, act 460 may be performed at a defined period of time, when triggered after an event, and/or each time a packet is to be transmitted.

The method for servicing a packet may include registering one or more service nodes 410; mapping registered service nodes 420; classifying a packet of data 430; determining system performance measurements 440; defining a service chain for the classified packet of data based on the system performance measurement 450; transmitting the packet to a service node 460; determining system performance measurements 470; changing the service chain based on a comparison of system performance measurements 480; transmitting the packet to a next hop address 490. Additional, different, or fewer acts than shown in FIG. 4 may be provided.

In act 410, one or more service nodes are registered. Registering a service node may include defining an address and service provided at the address. Service node registration may be used to map various services in a service insertion system. In act 410, a service node may provide a service broker with the information needed to map the service available for consumption and address of the service node.

In act 420, the registered service nodes may be mapped. Mapping the registered service nodes may include defining service chains and distributing service chain information. Additional, different, or fewer acts may be provided for mapping.

A service chain may be defined for one or more classifications. The defined service chains may be based on system performance, such as service times at the registered service nodes, transmission time, a SLA, or any other service related information.

Service chain information may be distributed to service nodes and service classifiers. The service chain information may define a service header, next hop address in the service chain, and/or tunnel type information. All, some, or none of the service information may be transmitted to the service classifier. For example, service chain information may be sent to a service classifier, in response to a request, via an ASCII namespace.

In act 430, a received packet of data is classified. The packet of data may be classified according to an originating endpoint, a terminating endpoint, type of traffic, as a rule, or any combination thereof. For example, classification may include matching the type of traffic to a defined namespace based on a classification rule, such as "if traffic X, then namespace "bestservice."

In act 440, system performance measurements are determined. Determining system performance measurements may include measuring a service time for one or more service nodes to perform a service; requesting system performance measurements; receiving system performance measurements; determining a first processing load on a first service node; comparing service performances; or a combination thereof.

Comparing service performance may include comparing service performance (e.g., transmission time, service time, and/or processing load) at a first service node to service performance at a second service node. The service performance may also or alternatively be compared to an acceptable service performance level set forth in a service level agreement. For example, the service chain may be changed such that a second service node performs the service when the service performance does not conform to the acceptable service performance level.

In act 450, a service chain for the classified packet is defined. The service chain may be defined based on a first system performance measurement, classification, or other information. The system performance may or may not be used for initial assignment of the service chain. The service chain may be defined by a service broker, service classifier, or reporting device. The service chain may define one or more service nodes.

In act 460, the packet is transmitted to a first hop service node. The packet may be transmitted to the first service node defined in the defined service chain.

In act 470, a second system performance measurement is determined. The second system performance measurement may be a real-time measurement. In other words, the second system performance measurement may be determined when the packet is being serviced, about to be serviced, was just serviced by a service node, or is being transmitted to a service node. The second system performance measurement may be determined by a service broker, service classifier, reporting device, or service node. The second system performance measurement may be a past measurement, such as measured within a last second, minutes, hours, or days.

The second system performance measurement may be compared to another system performance measurement. For example, the second system performance measurement may be compared to a system performance measurement at a second service node, a performance threshold set forth in a service level agreement, or some other defined or determined performance measurement.

In act 480, the service chain or next hop address may be changed based on the second system performance measurement. For example, the next service node that will service the packet may be determined based on the second system performance measurement.

In act 490, the packet is transmitted to a next hop address. The next hop address may be a service node address, reporting device address, terminating endpoint address, service classifier device address, service broker address, or any other address in or related to the service system. The next hop address is based on the service chain as altered to account for system performance. The same level of service is provided, but the service node providing the service is altered based on performance. As the packet proceeds along the devices defined by the service chain, no or other modifications may be made to the service chain based on system performance.

One benefit of the service system 10 is that a service chain (path) may be determined based on system performance. Accordingly, the service system 10 is able accommodate for delay, jitter, and/or load at a service node 50 within the service chain.

Another benefit of the service 10 may be that a service chain may be based on actual service times, and not just locations. Since the service nodes 50 register with a service broker 30, a map of the registered service nodes may be used to transmit based on system performance and not just location. For example, as illustrated in FIG. 3, the firewall 1a may be further from the endpoint 15a than firewall 1b. However, firewall 1a may be delayed. The service system 10 may automatically redirect the packet 11 through firewall 1b because it will be quicker and more efficient than waiting for firewall 1a to no longer be delayed.

Another benefit of the service system 10 may be that system performance may be correlated with a service level agreement. The service provider may use the correlation to redirect services to service nodes that are able to provide services in accordance with the service level agreement. The customers may use the correlation to ensure that service providers are performing in accordance with the service level agreement. For example, customers may ensure that the total service time is less than or equal to the agreed total service time.

Another benefit of the service system 10 may be real time changes made to the service chain. The service system 10 may change the service chain, even after the packet is provided to or served by one or more service nodes 50. Since the service nodes 50 are operable to determine system performance measurements, such as service times at one or more next hop options, the service nodes 50 may provide the packet of data to the service node with the shortest service time and/or transmission time. For example, the IPS device 2b, in FIG. 3, may determine and compare the transmission time and service time for a packet passed to QoS devices 3a and 3b. Based on this comparison, the IPS 2b may pass the packet to the QoS device 3a, 3b with the shortest transmission time and service time. The modification to the service chain accounts for the next hop address and service node only, or the modification accounts for multiple hops and service nodes at a given time. The service chain may be modified for one or more hops and service nodes.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. An apparatus comprising:
   a memory; and
   a processor in communication with the memory, the memory including computer code executable with the processor, wherein the computer code is configured to:
   receive a packet classification, associated with a packet of data;
   determine a first service chain for the packet classification based on measured system performances of a plurality of service chains including the first service chain, the first service chain defining a network of service nodes to perform a service on the packet of data; and
   transmit a service chain header that defines the first service chain.

2. The apparatus of claim 1, wherein the system performance comprises a service time, the service time being an amount of time for a service node to perform a service on the packet of data.

3. The apparatus of claim 1, wherein the network of service nodes includes a first service node and a second service node, the first and second service node being configured to perform a first service on the packet, the service header defining that the first service is to be performed by the first service node.

4. The apparatus of claim 3, wherein the computer code is configured to change the service header, such that second service node performs the service.

5. The apparatus of claim 3, wherein the computer code is configured to:
   measure a first service performance for the first service node,
   measure a second service performance for the second service node,
   generate a comparison between the first service performance and the second service performance; and
   change the service header based on the comparison.

6. The apparatus of claim 5, wherein the computer code is configured to receive the first service performance from the first service node and the second service performance from the second service node.

7. The apparatus of claim 1, wherein the computer code is configured to:
   measure a first service performance for the first service node,
   compare the first service performance to a service level agreement, and
   change the service chain header so that the packet of data is transmitted to a second service node, which is in accordance with the service level agreement, when the first service performance is not in compliance with the service level agreement.

8. The apparatus of claim 1, wherein the computer code is configured to transmit the service chain header to a service classification device.

9. A method, comprising:
   receiving a packet of data;
   classifying the packet of data;
   receiving a service chain header based on the classification of the packet of data, the service chain header defining a first service node to perform a service on the packet of data;
   determining a first service performance at the first service node;
   changing the service chain header when the first service performance is not in accordance with a service level agreement, the service chain header being changed to define a second service node; and
   transmitting the packet of data to the second service node.

10. The method of claim 9, wherein changing the service chain header includes comparing the first service performance at the first service node to service performance defined in the service level agreement.

11. The method of claim 9, wherein determining the first service performance includes determining a first processing load on the first service node.

12. The method of claim 11, wherein the first processing load is used to determine a first service time for the first service node.

13. The method of claim 9, wherein the service chain header is received from a service broker or a service classifier.

14. The method of claim 9, wherein the first service node and the second service node perform the same service to the packet of data.

15. Logic encoded in one or more non-transitory, tangible media for execution and when executed configured to:
   receive a packet of data having a service chain header that defines a first service node to receive the packet of data; and
   change the first service node in the service chain header to a second service node based on a first service performance of the first service node and a second service performance of the second service node;
   perform a service to the packet of data; and
   transmit the serviced packet of data to the second service node.

16. The logic of claim 15, when executed also configured to receive a message from a service broker, the message indicating that the first service node in the service chain header should be changed to the second service node.

17. The logic of claim 15, wherein the packet of data is received from a service classifier.

18. The logic of claim 15, when executed also configured to to measure a first service time, which is a time that is takes to perform a service to the packet of data.

19. The logic of claim 18, when executed also configured to report the first service time and a second service time for the second service node to a service broker that is operable to define a service chain.

20. The logic of claim 15, when executed also configured to report the first service time and a second service time for the second service node to a reporting device that is operable to report to a service broker.

* * * * *